Figure 4:
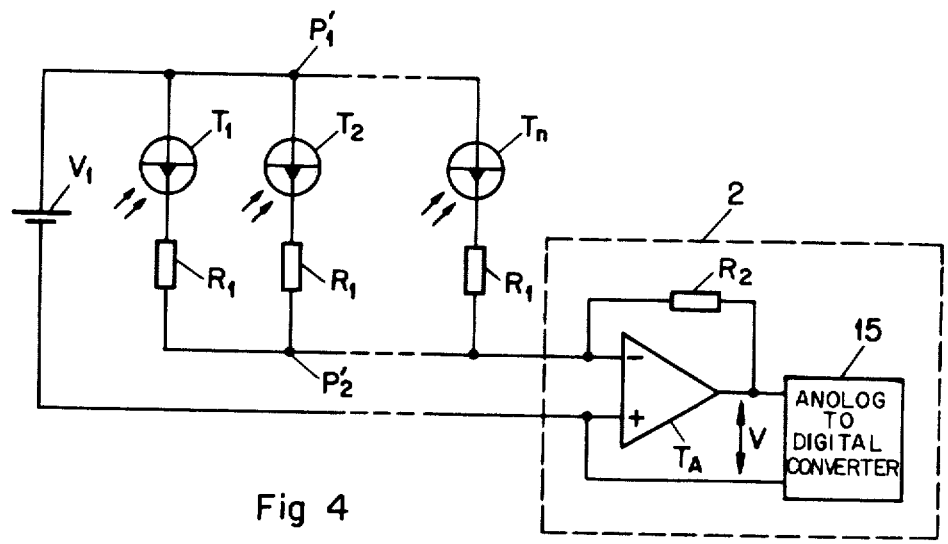

United States Patent
Wiklund

[11] 3,891,857
[45] June 24, 1975

[54] DEVICE FOR THE NON-CONTACT LENGTH MEASUREMENT OF OBJECTS

[75] Inventor: Klas Rudolf Wiklund, Taby, Sweden

[73] Assignee: AGA Aktiebolag, Lidingo, Sweden

[22] Filed: Feb. 22, 1974

[21] Appl. No.: 444,712

[30] Foreign Application Priority Data
Mar. 9, 1973 Sweden.............................. 7303302

[52] U.S. Cl. .............................. 250/560; 250/571
[51] Int. Cl.² ........................................ G01N 21/30
[58] Field of Search ........... 250/560, 222, 209, 571

[56] References Cited
UNITED STATES PATENTS
3,193,689 7/1965 Kerr.................................... 250/560
3,428,817 2/1969 Hofmeister et al. ................ 250/560

Primary Examiner—James W. Lawrence
Assistant Examiner—T. N. Grigsby
Attorney, Agent, or Firm—Lerner, David, Littenberg & Samuel

[57] ABSTRACT

Several embodiments of a device are disclosed for measuring the length of an object by employing a plurality of radiation sensors mounted to divide the length to be measured into a corresponding number of length increments. Each of the sensors respond to a range of radiation in a linear fashion and level off at a predetermined radiation level. The devices are adjusted so that when the length of the entire increment is irradiated, the radiation sensor corresponding thereto will be at its leveling off value. In operation signals from each of the sensors are added together to give an analogue reading of the length to be measured. In one embodiment the analogue signal is converted to digital form.

5 Claims, 9 Drawing Figures

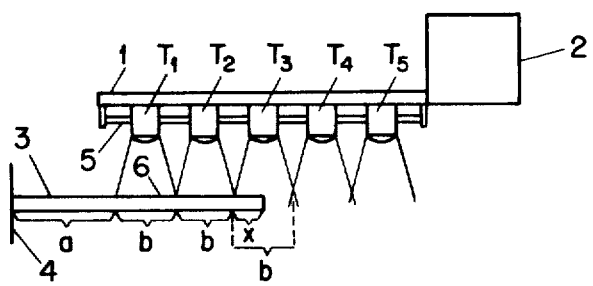
Fig 1a
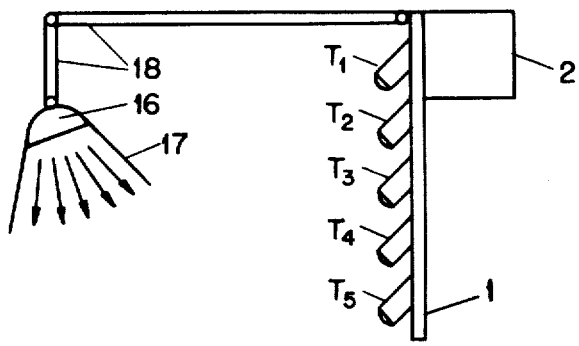
Fig 1b
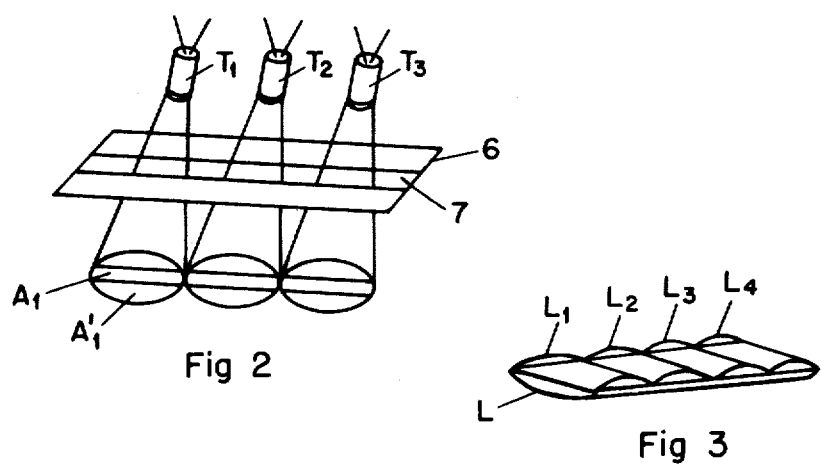
Fig 2
Fig 3

DEVICE FOR THE NON-CONTACT LENGTH MEASUREMENT OF OBJECTS

The present invention relates to a device for non-contact length measurement of objects which emit, absorb or reflect radiation within the ultraviolet, infrared or visible range of wavelengths.

In non-contact measurement of the lengths of objects it is known that optical methods can be applied so that e.g. a number of photodiodes sense that part of an object which is lit or which the object shields from the background. It is then possible by means of a suitable logic unit to determine the number of diodes which, by way of the ray path of the optical system, represent the lit or shadowed out surface as a measure of the wanted length. If the resolution demanded is great the number of diodes will also have to be great, since a diode in such a case only represents a whole increment.

Such a device generally comprises several hundred photoelements, and these are so connected to the logic unit that the number of leads to this unit becomes very great, resulting in an expensive and complicated construction.

Another known method consists in making use of an integrated circuit with a so-called "diode array" and in projecting by means of an optical system the image of the lit length onto the diodes. This method has the disadvantage, however, that if from considerations of space the diodes cannot be placed a good distance away from the object a fairly wide-angled lens has to be used, which gives rise both to an expensive optical system and to a measuring uncertainty in the outer edges, if the distance of the measured object from the optical system cannot be kept constant.

The device in accordance with the invention overcomes the abovementioned disadvantages, in that the wide-angle lens which impairs the accuracy of measurement is not used, since no use is made of an integrated photodiode design; in that, although for the sake of good resolution the number of photoelements may be made large, the number of leads is small and independent of the number of photoelements; in that the number of photoelements can be restricted owing to the device being adapted so that it measures also lengths inside the increment division.

Up to now and in the continuation devices comprising photosensitive elements will be described. It should be pointed out already, however, that devices according to the invention, besides being used for visible light, may also be used for ultraviolet and infrared radiation. The radiation-sensitive elements which are used may accordingly have a broad spectrum or a narrow spectral sensitivity range for the receiving of all the radiations mentioned earlier, so that the most favorable adaptation for the particular purpose of the measurement can be achieved.

The device in accordance with the invention is characterized by what is disclosed by the attached claims.

In accordance with the invention use is made of the fact that a radiation-sensitive element (phototransistor, photodiode), which is sensitive to radiation within a greater or smaller part of the range $10^{-4}$ to $10^{-8}$ meters, that is to say to infrared, visible and ultraviolet radiation, reacts as a linear current generator supplying a current which is proportional to the radiation incident upon the element. Since photodiodes have a lower sensitivity, it is more suitable for many applications to use phototransistors. A phototransistor has a low base voltage and as it also has a high inner resistance, it acts in principle as a current generator.

Use is made of this property in the device in accordance with the invention and the current through the phototransistor will vary linearly with the luminous flux (or corresponding flow in the invisible spectral range) on the phototransistor. If the phototransistor is strongly irradiated, it will bottom and it will then be necessary to take into consideration the base resistance of the transistor which gives rise to a base voltage which is usually of an order of magnitude or 0.01 – 0.5 volts.

Usually a certain leakage current (dark current) also occurs in photosensitive elements in spite of no radiation falling onto the element. It is shown in the following by way of further embodiments and devices in accordance with the invention how the effect of base voltages and dark currents on the measuring result can be appreciably reduced.

Figure 5:
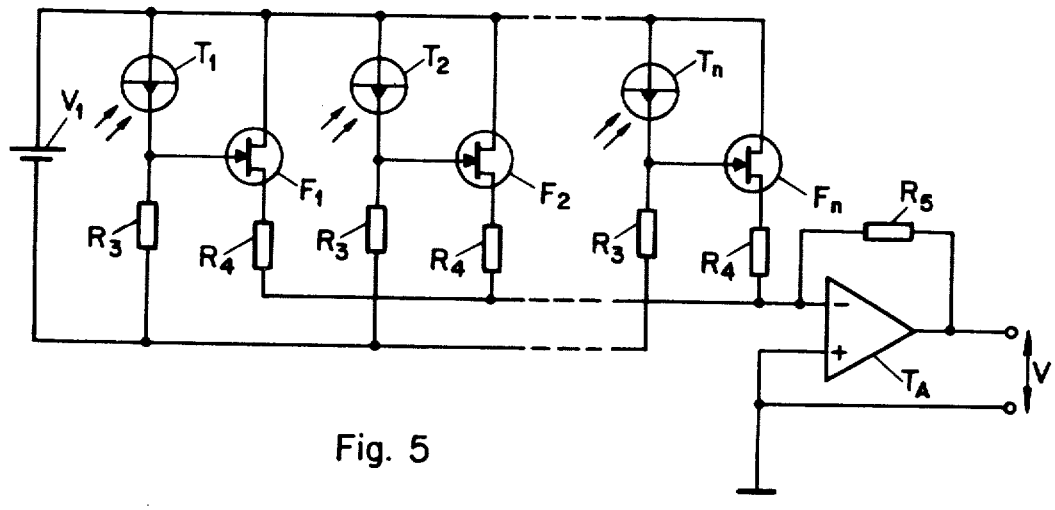
Figure 6:
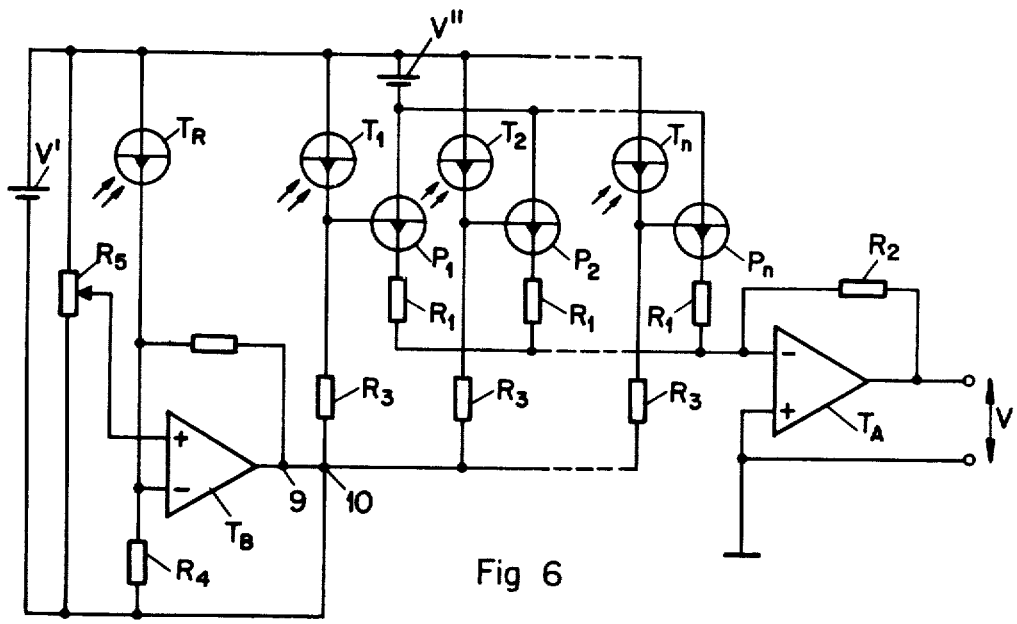
Figure 7:
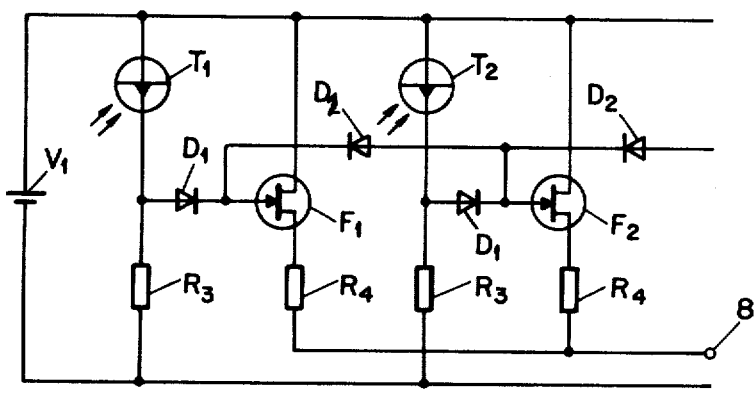
Figure 8:
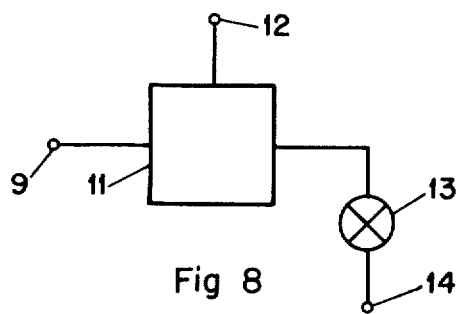

The device in accordance with the invention will be described in more detail with the help of the enclosed drawing in which FIG. 1a, b show a device in accordance with the invention for the measurement of the length of an object, FIG. 2 shows a further embodiment of a detail in FIG. 1, FIG. 3 shows a modification of the device in FIG. 2, FIG. 4 shows a schematic circuit diagram of a device in accordance with the invention, FIGS. 5, 6 and 7 show different further embodiments of the device in accordance with FIG. 4, FIG. 8 shows an alternative to a detail in the device according to FIG. 6.

FIG. 1a shows the principle of the measurement of the length of an object by means of a device according to the invention. On a holder element 1 is arranged a number of radiation-sensitive elements, for example phototransistors $T_1 - T_5$. The phototransistors, as will be shown in later figures, are connected to an evaluating unit 2.

The phototransistors are arranged in a straight line and directed towards the measuring section so that they receive substantially the radiation issuing perpendicularly from the measuring section. An object whose length is to be measured is designated by numeral 3 in FIG. 1a. Furthermore, the object rests against a reference support 4, whose position is fixed and specified in advance and from which the evaluation device 2 automatically calculates the length of the object.

In the figure is shown how the one end of the object 3 rests against the reference support 4 whilst its other end is inserted underneath the phototransistors $T_1 - T_5$. By the side of the phototransistors is arranged the luminous tube 5. Light from the luminous tube 5 incides upon the object 3 and is reflected from there back to the phototransistors. The phototransistors are arranged so that they each receive luminous flux only from a certain part of the object. This part is indicated for phototransistor $T_1$ by the area 6 in the figures. These areas must touch one another for adjacent phototransistors, but certain non-linearities of the phototransistors can be compensated if the areas slightly overlap each other. To obtain a high resolution of the measuring result, the phototransistors must be placed relatively densely. If there is no object in front of a phototransistor it can be assumed that the luminous flow inciding on the phototransistor will be so small that it does not give rise to any current according to what has been said before. If an object fully covers the surface which the phototransistor picks up, as is the case with phototransistors $T_1$ and $T_2$ in FIG. 1a, it is assumed that the dimensioning is such that the luminous flux to the phototransistor causes the latter to bottom.

The object which is measured in FIG. 1a is of such a length, however, that it does not exactly cover the surface which is picked up by a whole number of phototransistors, but the surface that is picked up by phototransistor $T_3$ is covered only partly by the object.

As mentioned earlier, each phototransistor gives off a current which has a linear relationship with the radiation flux incident on the phototransistor. The evaluating unit 2 in FIG. 1a will in the case illustrated in the figure receive a saturation current from the transistors $T_1$ and $T_2$ and a smaller current, added to it, which is proportional to the surface picked up by the phototransistor $T_3$ as covered by the object. The evaluating unit 2 is calibrated so that when it receives saturation current from a transistor it can evaluate the same as a certain unit length. The added current from the phototransistors thus constitute a measure of wanted length from the first phototransistor and to this can be added automatically the length designated by $a$ in the figure and which constitutes the length from the reference support 4 to the start of the surface which is picked up by the first phototransistor $T_1$. In this case no radiation incides upon phototransistors $T_4$ and $T_5$ and they will therefore deliver no current to the evaluating unit 2.

Naturally the measuring of the length may also take place so that the object which is to be measured is placed wholly inside the surface which is picked up by the phototransistors. In so doing a number of phototransistors is required which is sufficient to cover the actual length area or at least the area where the start and the end of the object are expected to lie.

However, if long objects are to be measured and if the variation in length between these objects is relatively small, it is evidently advantageous to arrange the device according to the invention so that it picks up the lengths as shown in FIG. 1a. Here the length which the phototransistors pick up need only be of the same order of magnitude as the differences in length of the objects which are to be measured.

By selecting, as mentioned above, the optical radiation angle so that the substantially fully irradiated surface corresponds to the fully bottomed phototransistor, and the substantially non-irradiated surface corresponds to the fully open one, a considerably improved accuracy of measurement and resolution can be obtained, owing to the current through the phototransistor being proportional to the luminous flux received.

In the device shown in FIG. 1a the radiation-sensitive element is placed so that its principal directions sensitive to radiation are perpendicular to the measuring section. In certain cases it is advantageous to place the element so that the said principal directions lie obliquely to the measuring section. For good function it is required, however, that the said principal directions should be parallel.

In FIG. 1b is shown a positioning of the radiation-sensitive elements which in many cases may be space saving. The elements $T_1 - T_5$ have here been placed in a vertical holder element 1 and are oriented so that their principal direction substantially forms an angle of 45° with the horizontal object 3. An adjustable arm 18 carries a lamp 16 with screen 17 oriented so towards the object 3 that the light can not be incident directly upon the elements $T_1 - T_5$. These elements are connected to an evaluating unit 2.

The placing of the lamp 16 must be such that the edge 19 of the object is not illuminated, thus preventing this edge from being included in the measured length. The fact that the edge opposite the edge 19 is illuminated is of no importance, since this cannot contribute to the radiation to the photo-sensitive elements.

By means of the device in FIG. 2 it is further possible to improve the linearity of the device in accordance with the invention in that the conical aperture angles for ordinary phototransistors or photodiodes, which give a sensitive circular surface on the object, have been made substantially rectangular.

This was achieved in FIG. 2 by means of aperture plates which are inserted in the ray path. These aperture plates are designated 6 in the figure and the apertures themselves have the designation 7. Without the aperture plates 6 the photo-component $T_1$, for example, has the sensitive circular surface $A_1$ at a certain distance from the component. By inserting the aperture plate 6, this surface is reduced until it has become substantially a rectangular surface $A_1$.

In FIG. 3 is shown another device to ensure that the sensitive surface for a photo-component will be substantially rectangular. This consists of a cylindrical lens L, whose generatrices of the cylinder surface are parallel with the measuring section. With such a lens substantially the same thing is achieved as with the aperture plate 6 in FIG. 2. However, the action of the device can be further improved, in that a further cylindrical lens is arranged orthogonally to the cylindrical lens L for each of the photo-components. This further cylindrical lens has in FIG. 3 the designation $L_1$ when belonging to the first photo-component, $L_2$ when belonging to the second etc.

In FIG. 4 the photosensitive elements have the designation $T_1, T_2 \ldots T_n$ and are constituted in this case of phototransistors. Each phototransistor is coupled in series with its resistor $R_1$ and then connected in parallel to one another between the points $P_1'$ and $P_2'$. If the phototransistors are of the npn-type the common points $P_1'$, which connect the collectors of the phototransistors with one another, are connected to the positive pole of a direct voltage source $V_1$. The negative pole of this direct voltage source is connected to the non-inverting input of an operational amplifier $T_A$. The other common point $P_2'$ is connected to the inverting input of the operational amplifier. Furthermore the operational amplifier has a feedback by means of a resistor $R_2$. Apart from possible leakage currents of the phototransistors, no current will flow through the phototransistors when no luminous flux incides on them, that is to say when no object is present in the measuring section, but the phototransistors will be kept cut off. The voltage V at the output of the operational amplifier $T_A$ will then be zero.

The operational amplifier, as shown in FIG. 4, may be connected to an analog-to-digital converter 15, the latter together with the operational amplifier $T_A$ forming the evaluating unit 2 in FIG. 1.

If now an object is introduced into the measuring path, as shown in FIG. 1a, the current from the two first phototransistors $T_1$ and $T_2$ will be maximum, since these transistors are bottomed. The light on the third phototransistor, however, will give rise to a current through the phototransistor which is proportional to the luminous flux incident upon this phototransistor. The currents throught the phototransistors are added to one another and are fed to the operational amplifier, which gives rise to a change of voltage on the output of the operational amplifier. This change of voltage on the output of the operational amplifier represents a measure of the length of the object.

The basic concept of the device in accordance with the invention, such as it is shown in FIG. 4, consists in the use of a phototransistor as a linear current generator, where the current is proportional to the luminous flux incident upon the phototransistor.

However, the device in accordance with FIG. 4 has certain disadvantages in that the dark current from the phototransistors which are outside the object which is to be measured, will contribute to the true length of the object being overestimated by the device. These dark currents from each phototransistor on which no luminous flux incides, add on to one another, and the more such phototransistors are included in the device, the greater will be the dark current. It is difficult therefore to compensate for such a dark current since it will vary as a function of the length of the object which is to be measured. Moreover, the dark current (leakage current) is temperature-sensitive, which further complicates a compensation, and furthermore, the phototransistors which during a certain measurement are bottoming always have a certain base resistance which gives rise to a base voltage. These base voltages tend to give rise to the length of the object being underestimated. This underestimate increases with the number of bottomed phototransistors included in the measurement. It is important that the resistance of each phototransistor should be matched to the resistances of all the other phototransistors so that when a certain radiation strikes a phototransistor this should give rise to a current of a similar magnitude as that produced by a similar radiation on another phototransistor in the chain.

FIG. 5 shows a further embodiment of the device in accordance with the invention, which device provides suppression of dark current and increased accuracy and permits a greater spreading of the sensitivity of the phototransistors to be tolerated. Furthermore, scattered light within moderate limits on the phototransistor will not have any effect on the device.

In this device a number of phototransistors $T_1, T_2 \ldots T_n$ are connected in parallel across a voltage source $V_1$, each phototransistor being provided with an emitter resistor $R_3$. Each phototransistor controls then in turn a component $F_1, F_2 \ldots F_n$ with a large open-and-close ratio, for example a field effect transistor. In this case each field effect transistor together with a resistor $R_4$ constitutes one of the aforementioned current generators. These current generators are connected in parallel with one another and to the operational amplifier $T_A$, said amplifier having a feedback by means of resistor $R_5$.

In the device according to FIG. 5 thus each photo-sensitive element controls one field effect transistor. This may vary continuously between two extreme states, where the one is fully cut off and the other is fully bottomed. Field effect transistors with low leakage current in cut-off state combined with low base voltage in bottomed state ought to be chosen. The base voltage of such a field effect transistor is moreover stable and will therefore not be important with regard to the accuracy of the measuring result.

In FIG. 6 a device is shown which in its basic design offers approximately the same advantages as the device according to FIG. 5, However, the field effect transistors in FIG. 5 have been replaced by transistors connected as emitter-followers. The device in FIG. 6 moreover includes a circuit which prevents dirt on the photo-sensitive element, or variations in the general lighting of the premises, where the device in accordance with the invention is used, from affecting the measuring result.

The phototransistors $T_1, T_2 \ldots T_n$ control, in the same manner as mentioned in connection with FIG. 5, an element with a large open-and-close ratio. This element consists in the device according to FIG. 6 of a transistor $P_1, P_2 \ldots P_n$. Here each transistor together with an emitter-resistor $R_1$ thus represents a current generator. The phototransistors are fed from a voltage source $V'$, but for reasons associated with the circuit design, the transistors $P_1, P_2 \ldots P_n$ are not merely fed by the voltage source $V'$ parallel with the phototransistors but a further voltage source $V''$ is inserted in the collector circuits of the emitter follower. The transistors $P_1, P_2 \ldots P_n$, which are controlled by the phototransistors, operate as mentioned previously as emitter followers and vary continuously between two states. On the one hand a wholly cut-off state when the emitter follower, in reality its base, operates in reverse direction in the case when npn-transistors are used. In this case, therefore, no current flows in the direction towards the common conductor to the summator (operational amplifier $T_A$). In this case only a very small leakage current will affect the measuring result. At the same time elements can be chosen which have a very small leakage current (dark current), so that the effect upon the measuring result can be minimized. On the other hand the emitter followers can assume a bottomed state, in which case a well-defined current is obtained which is produced by the voltage between the collector and the lead to the summator via the resistor $R_1$. In this bottomed state each transistor has a certain base voltage, and such transistors may be chosen which have a low base voltage, in the order of magnitude of 10 millivolts. This means that the accuracy will be sufficient for the purpose of application. A further advantage of transistors of this type, as in the case of field effect transistors, lies in the base voltages being stable, so that their effect on the measuring result will be very small.

In certain applications of the measuring device in accordance with the invention it may be feared that the photo-sensitive elements, or the lenses possibly located in front of these, may be exposed to contamination. In certain cases it may be thought that such contamination can be prevented by blowing compressed air past the components exposed to contamination. At the same time, in the case where visible light is used in the measuring device, changes in the lighting arrangement or in the lighting of the premises in general, give rise to a distortion of the measuring result. It can also be assumed that if in the method used the light is reflected from the object to be measured, the character of the surface of the object will vary from object to object, so that the luminous intensity may be somewhat unequal. This may be eliminated to a substantial degree, however, if by means of a further photo-sensitive element, appropriately with a spectral and temperature-sensitivity of a similar kind as that of the remaining photo-sensitive elements, the integrated value of the measured radiation is monitored. Such a device is included in FIG. 6 where this further photo-sensitive element has the designation $T_R$. This element controls an amplifier $T_B$, so that the voltage across the other photo-sensitive elements included in the measuring process is varied with the total luminous intensity on the measuring object. A reference value is set manyally before the start of a measuring series by means of the resistor $R_5$ which is connected to the amplifier $T_B$. This further photo-sensitive element $T_R$ is connected to the inverting input of this amplifier, whilst the reference voltage is connected to the non-inverting input.

FIG. 7 shows a part of the device according to FIG. 5, but with the difference that each photo-sensitive element $T_1$, $T_2$ controls a field effect transistor $F_1$, $F_2$ via a diode $D_1$ and that the gates of the field effect transistors are connected to one another via diodes $D_2$. By means of this circuit a bottoming is always secured of the field effect transistors included earlier in the measuring chain. The measurement can take place only from one direction in the measuring device and the diodes $D_2$ shall be connected so that a phototransistor, which controls the field effect transistor belonging to this transistor to change to bottoming, will also ensure bottoming of the field effect transistors included earlier in the measuring chain.

FIG. 7 shows only two photo-sensitive elements, the common lead for the current generators being that designated 8 in FIG. 7.

In FIG. 6 is shown how a further photo-sensitive reference element varies the voltage across the remaining photo-sensitive elements included in the measuring process. In FIG. 8 is shown that this reference element may instead, for example, work upon the lamp, whose light is reflected by the object towards the photo-sensitive elements. The circuit between points 9 and 10 in FIG. 6 is then opened and instead point 9 will be connected to a control device 11 in FIG. 8, said control device regulating the voltage across a lamp 13 between the poles 12 and 14 of a voltage source. The control device 11 may include thyristors.

It is also possible by inserting a collector resistance in one of the photo-sensitive transistor circuits to allow this phototransistor to have the double task, on the one hand to be part of the measuring system like the other phototransistors and on the other hand to constitute a reference element. The voltage is fed via the said collector resistance to an operational amplifier which can then be connected as the operational amplifier $T_B$ in FIG. 6.

As mentioned earlier, the object which is to be measured is divided, or a part of this object is divided, into a number of length increments. To each such increment is allotted one photo-sensitive element, and the length of the object can be determined, in that the photosensitive elements for each increment which is wholly covered by the object adds a certain current which, so to speak, can be evaluated in a digital manner. However, the object will often have a length which does not correspond to a whole number of increments, but, after the photo-sensitive element which indicates full coverage of its pick-up surface by the object, follows a photo-sensitive element which will give rise to a current which is less than that which each of the photo-sensitive elements included earlier in the chain delivers.

It should be mentioned here that in certain circuits in accordance with the invention it is not the current of the photo-sensitive element which is evaluated, but the current from an amplifying element which is controlled by the photo-sensitive element.

By the analog evaluation of the said current a very accurate determination of the further increment can be made. In other words, the measuring process can be divided into a digital and an analog part. It can also be said that the evaluation is carried out according to the "vernier principle." If we consider, for example, the device in FIG. 6, we find that the digital part, that is to say the whole number of increments, if the object measured is determined as being proportional to the voltage shown in the figure $V = V_1 \, n \cdot R_2/R_1$ if $R_1 >> R_2$, where $V_1$ is the voltage across the transistors $P_1, P_2 \ldots P_n$ and the resistor $R_1$. The analog part of the measuring result comes as an additional voltage to the voltage $V$ and this is proportional to the part of the surface picked up by the photo-sensitive elements which the object covers. The complete equation for the voltage on the output of the operational amplifier $T_A$ will thus appear as follows:

$$V = V_1 \frac{R_2}{R_1} (n + \frac{x}{b})$$

where $x$ is the part of the length increment $b$ which is covered by the object. In the digital part of the measurement $x = b$ for each increment which is wholly covered by the object. It is then possible, in a known manner by calibration of the device, to obtain a direct reading of the voltage so that the length of the object is indicated in the desired quantities.

As mentioned, the elements controlled by the phototransistors operate as current generators together with a resistor. In certain cases, however, the said resistor may be omitted and the inner resistance in the element will be sufficient.

As mentioned in the introduction, it is appropriate to place some optical system or aperture plate in front of the detector element. This optical system may also include an optical filter for a narrow wavelength spectrum and/or a light source with a distinct spectrum may be used. This makes the device more sensitive to length measurements and at the same time any disturbing effects of other light present on the premises are avoided.

As indicated earlier, the device can operate so as to detect the light which is reflected by the object towards the detectors. It is also possible, however, to fit the light source on the opposite side of the object seen from the photosensitive element, the length of the object being gauged so that the part of the measuring section shaded by the object is evaluated.

In a measurement where the infrared part of the spectrum is used, the object may for example be heated first and then measured, or the object may be allowed to pass a hot background, the "shading" being measured.

The voltage from the operational amplifier may be used directly for analog presentation of the length of the object, but this voltage may also be converted by means of an analog-to-digital converter (for example a digital voltmeter) to a digital measure of the length wanted. Naturally, the values can be recorded, for example on tape.

The values obtained may also be utilised by elements connected with the device in accordance with the invention for the automatic treatment of the object concerned or the sorting of objects, etc.

I claim:

1. A device for measuring the length of an object including: a plurality of radiation sensors mounted to divide the length which is to be measured into a corresponding number of length increments, each of said sensors providing a first signal level when no radiation is incident thereon and a second signal level when more than a predetermined amount of radiation is incident thereon and a signal between said first and second signals level for radiation below said predetermined level; and means for combining signals from said plurality of sensors to provide a measurement of the length of said object; the device being characterized in that the area from which each of the sensors receives radiation is arranged so that by means of an optical element inserted in each sensor, the ray path is restricted to a substantially rectangular shape; said device being further characterized in that the said optical elements consist of a cylindrical lens whose generatrices of the cylinder surface are parallel with the length being measured.

2. A device in accordance with claim 1, characterized in that the said optical elements are mounted above a first cylindrical lens, whose generatrices of the cylinder surface are parallel with the length being measured, and additionally cylindrical lenses one for each sensor, said additional cylindrical sensor being arranged orthogonally to the first cylindrical lens.

3. A device for measuring the length of an object including: a plurality of radiation sensors mounted to divide the length which is to be measured into a corresponding number of length increments, each of said sensors providing a first signal level when no radiation is incident thereon and a second signal level when more than a predetermined amount of radiation is incident thereon and a signal between said first and second signals level for radiation below said predetermined level; and means for combining signals from said plurality of sensors to provide a measurement of the length of said object; said device also including a further radiation sensor for controlling the combining means to calibrate the same.

4. A device in accordance with claim 3 in which the further radiation sensor controls a voltage across said plurality of radiation sensors.

5. A device in accordance with claim 3 also including irradiating means for irradiating said length being measured and said further radiation sensor controls said irradiation means.

* * * * *